Feb. 28, 1928.
J. W. LAWLESS
1,660,450
VALVE STRUCTURE
Filed April 27, 1926   2 Sheets-Sheet 1
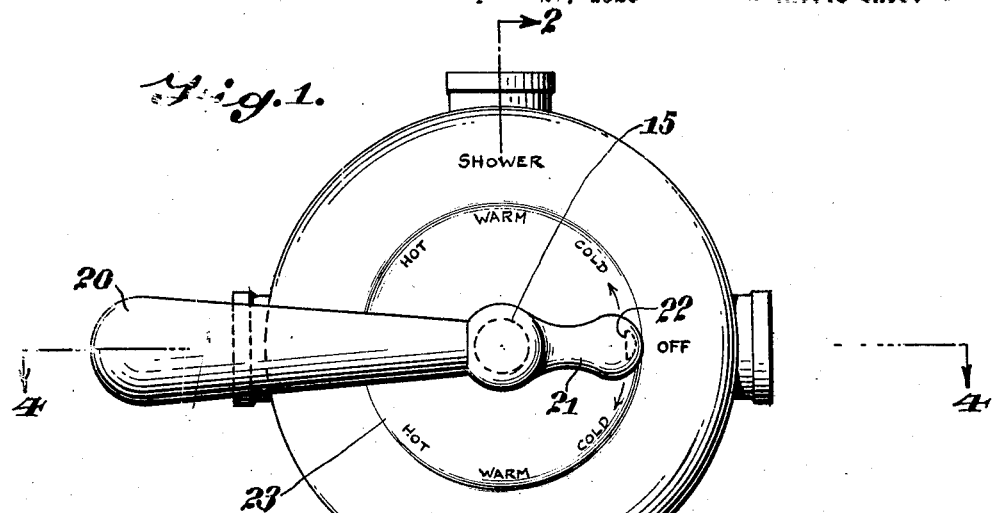
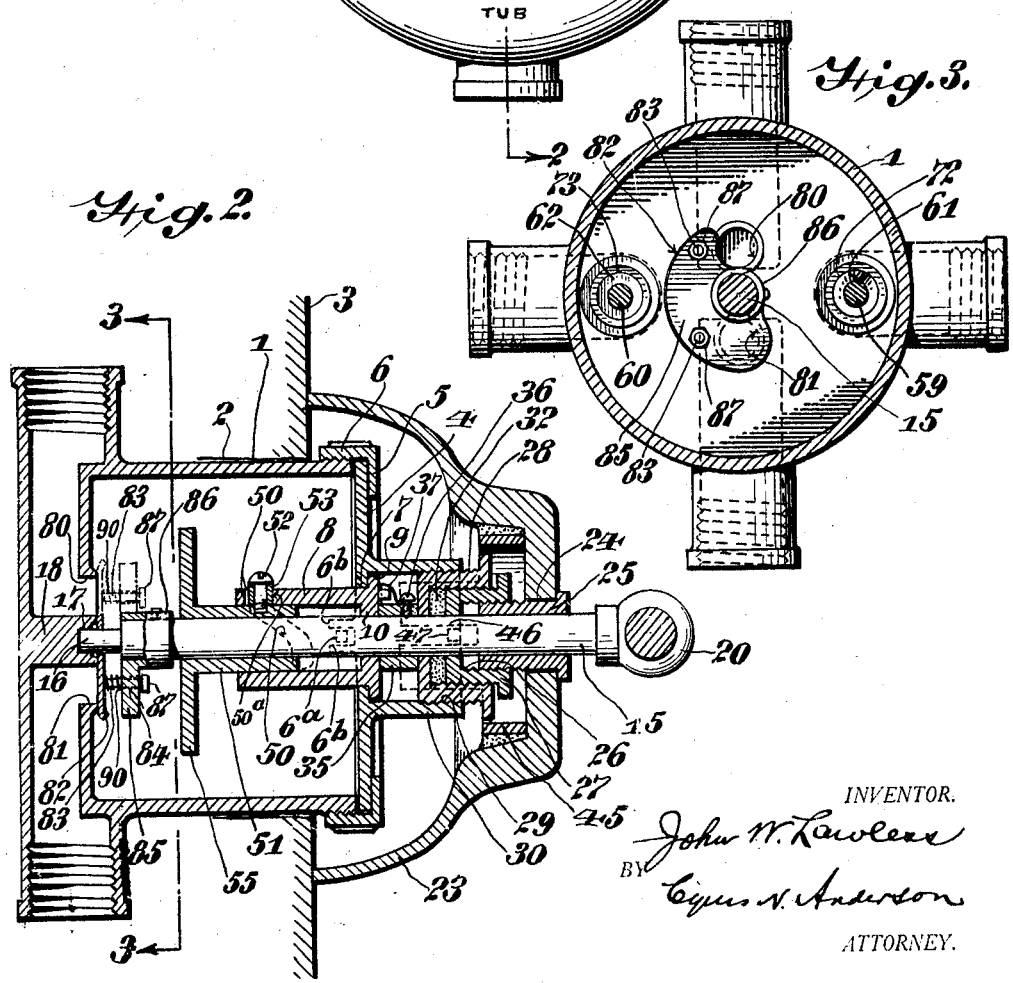
INVENTOR.
John W. Lawless
BY Cyrus N. Anderson
ATTORNEY.

Feb. 28, 1928.
J. W. LAWLESS
1,660,450
VALVE STRUCTURE
Filed April 27, 1926     2 Sheets-Sheet 2
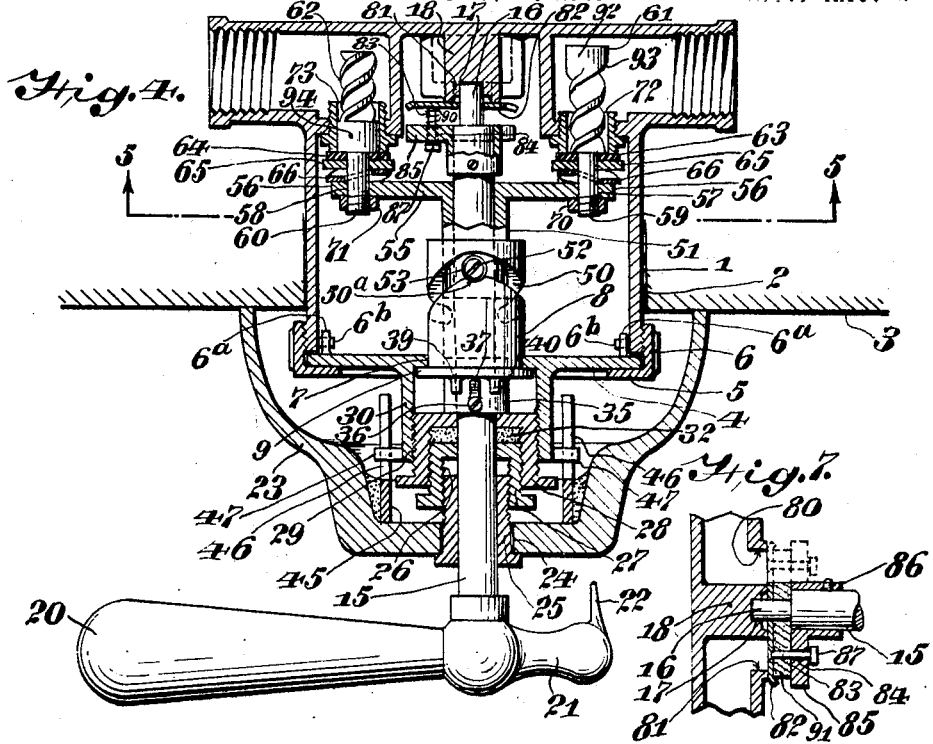
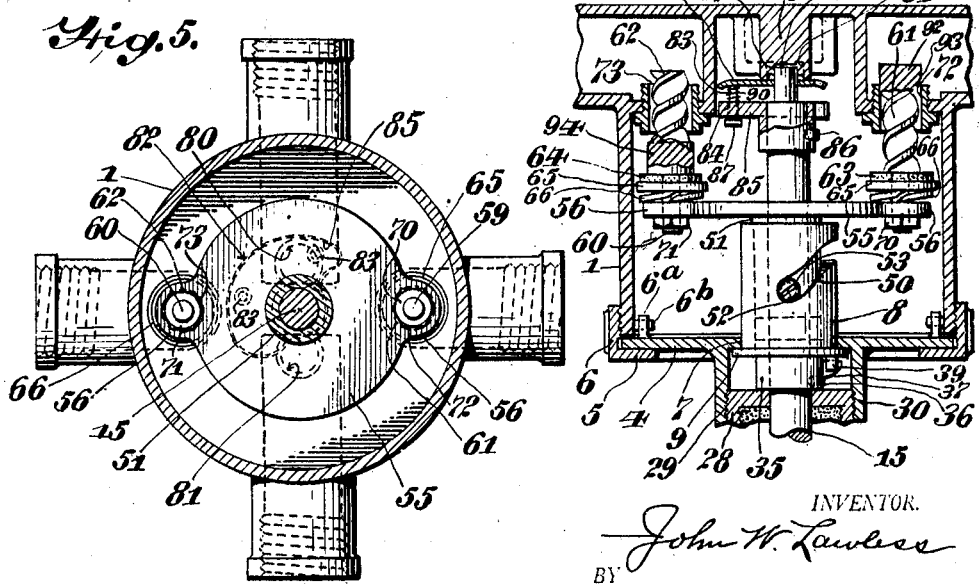
INVENTOR.
John W. Lawless
BY
Cyrus N. Anderson
ATTORNEY.

Patented Feb. 28, 1928.

1,660,450

UNITED STATES PATENT OFFICE.

JOHN W. LAWLESS, OF CAMDEN, NEW JERSEY.

VALVE STRUCTURE.

Application filed April 27, 1926. Serial No. 104,874.

My invention relates to valve structures of the type employed for controlling the flow of water to two different destination points, one of which may be a bath tub and the other of which may be a shower.

The general object of the invention is to provide a valve of simple and novel construction which is highly efficient in operation and which may be constructed at a minimum of cost.

It also is an object of the invention to provide a valve structure having an improved and novel means for actuating and controlling the positions of the valves with respect to the openings to be opened and closed thereby.

Another object of the invention is to provide a valve structure comprising a pair of inlet openings and a pair of outlet openings and having a novel arrangement of valves for controlling the said inlet and outlet openings and of means for supporting and actuating the said valves.

To these and other ends the invention comprehends the construction as hereinafter described in detail, particularly defined in the claims and as illustrated in the accompanying drawings in which I have shown one form of a convenient mechanical embodiment of the said invention.

However, I desire that it shall be understood that the invention may be embodied in other forms of construction than that shown and that changes in the details of construction may be made within the scope of the claims without departing from the principle of the invention.

In the drawings:

Fig. 1 is a view in front elevation of a valve structure embodying the invention;

Fig. 2 is a view in central vertical section taken on the line 2—2 of Fig. 1;

Fig. 3 is a transverse sectional view taken on the line 3—3 of Fig. 2;

Fig. 4 is a central horizontal sectional view taken on the line 4—4 of Fig. 1;

Fig. 5 is a transverse sectional view taken on the line 5—5 of Fig. 4;

Fig. 6 is a horizontal sectional view of a fragmentary portion of the valve structure showing certain of the parts thereof in different positions from what they are shown in Fig. 4; and Fig. 7 is a central longitudinal sectional view of a fragmentary portion of the structure showing a slight modification of the structure.

Referring to the drawings, 1 designates a casing of tubular form, preferably cylindrical, which is mounted within an opening 2 of like shape in a wall 3. The front end of the casing 1 is open and is adapted to be closed by a closing plate 4 which is held in place by a holding device comprising an inwardly extending flange 5 and a flange 6 which is internally screw-threaded for engagement with external screw-threads upon the exterior of the outer end portion of the casing 1. In order that the plate 4 may be placed in desired position with relation to other parts of the structure I have provided the said plate at points, preferably in diametral relation with respect to each other, with inwardly extending lugs 6ª which are adapted to extend into the spaces between two pairs of lugs 6ᵇ which extend or project inwardly from oppositely disposed portions of the casing 1. The closing plate 4 is provided with a central opening 7 within which is rotatably mounted a tubular member 8 provided upon its outer end with an outwardly extending annular flange 9 and an inwardly extending annular flange 10. The outwardly extending annular flange 9 is adapted to contact with the outer side portion of the closing plate 4 surrounding the opening 7, whereby the extent of inward movement of the said tubular member is limited.

A valve controlling shaft 15 extends through the tubular member 8 and is partly supported upon the flange 10 which constitutes one bearing therefor. The inner end of the shaft 15 is provided with a reduced extenson 16 which is supported in a bearing at 17 formed in a projection 18 provided at the rear side of the casing 2. The shaft 15 extends forwardly a considerable distance beyond the closing plate 4 and is provided at its outer end with a handle 20 by means of which it is adapted to be turned. The said handle is provided with an extension 21 having an inwardly extending pointer 22 which is adapted to co-operate with insignia upon the front side or surface of a hollow cover or dial plate 23 which conceals the front portion of the valve structure. The hollow cover or dial plate 23 is provided with a central opening 24 within which is mounted a flanged sleeve 25 through which the shaft 15 extends. The said sleeve constitutes an outer bearing for the said shaft. The inner end of the bearing sleeve 25 is externally screw-threaded and is in engagement with the internal screw-threads 26 of a gland 27 which in turn is in screw-threaded engagement with the interior of a plug 28 which is provided with exterior threads which are in adjustable engagement with the interior threads 29 upon an annular flange 30 which is integrally or otherwise connected with the closing plate 4. Interposed between the inner end of the gland 27 and the bottom of the plug 28 is annular packing 32.

A collar 35 is mounted upon the shaft 15 between the inner end of the plug 28 and the flange 10. The said collar is adapted to be held in place by a binding screw 36. The said collar is provided with a projection 37 which is located between and spaced from projections 39 and 40 which are mounted upon and extend outwardly from the outer front end of the tubular member 8. The purpose of spacing these projections in the manner as indicated in Fig. 4 of the drawings will be set forth hereinafter.

In order that the dial plate 23 may be set in the desired relation with respect to other parts of the structure the said plate is provided upon its inner side with a ring 45 from which slotted projections 46 extend inwardly. The flange 30, previously referred to, is provided with outwardly extending radial projections 47 which extend into the said slots, whereby the said dial plate may be accurately located in the desired relative position.

It will be understood that by adjusting the parts 25, 27, 28 and 30 with relation to each other the length of the structure composed of these parts may be varied so as to adapt the device to be mounted in and upon walls of different thicknesses. Cover or dial plates 23 of different heights or depths may be employed to meet different conditions as to wall thickness as they may arise.

The tubular member 8 is provided upon its inner end with a curved cam slot 50 which extends around the greater portion thereof. The central point or portion of the said cam slot is the highest portion; that is to say, it is that portion which is farthest away from the front end of the said member. The portions of the said cam slot upon opposite sides of the middle point thereof extend around the tubular member 8 and toward the front end thereof, as is clearly shown in the drawings. The cam slot 50 is provided at its middle upon its concave side with a notch or depression 50$^a$. A sleeve 51 is mounted upon the shaft 15 within the casing 1. The front end portion of the sleeve extends into the rear end of the tubular member 8. The said sleeve is provided with a stud 52 which extends through the cam slot 50, previously referred to. The said stud is provided with a roller 53 which engages the side walls of the said slot. The sleeve 51 is provided at its rear end with a circular flange 55 provided with projections 56 in diametrical relation with respect to each other. These projections are provided with openings 57 and 58 within which the stems 59 and 60 of valves 61 and 62 are mounted. Shoulders separate the stems 59 and 60 from the valves 61 and 62. Mounted upon the said stems and in contact with the said shoulders are washers 63 and 64. Mounted upon each of the stems 59 and 60 are additional washers 65 and 66, the latter of which are of spring type, as shown. The presence of the spring washers 66 causes the roller 53 on the stud 52 to seat in the notch 50$^a$ when the valves for the inlet openings are in closed position. The seating of the roller 53 in the notch 50$^a$ prevents accidental movement of the member 8 to cause accidental opening of the said inlet opening valves. Nuts 70 and 71 upon the outer ends of the stems of the said valves operate to secure and hold the said valves upon the projections 56, previously referred to. When the stud 52 occupies a position at the middle point of the cam slot 50 the valves are held with the washers 63 and 64 in contact with the inner ends of the walls of the cold and hot water inlet openings 72 and 73. In such position the said openings are closed, so that no water from either the cold water source or the hot water source is permitted to enter the interior of the valve structure.

The handle 20 is shown in Figs. 1 and 4 in normal inoperative position with both inlet openings 72 and 73 closed.

Leading from the valve casing 1 are outlet openings 80 and 81 which are adapted to be opened and closed by a valve member 82 which is mounted upon the rear ends of supporting studs 83 which are slidably mounted in openings 84 which are provided in a plate 85 which is integral with a collar 86 which is rigidly or fixedly secured to the inner end portion of the shaft 15. The studs 83 are retained in the openings 84 by means of nuts 87. Coiled springs 90 are mounted upon the studs 83 intermediate the plate 85 and the valve 82. These springs tend to expand and operate to hold the valve 82 outwardly and in spaced relation with respect to the plate 85. It will be seen, therefore, that the valve 82 is adapted to have yielding contact with the inner or front ends of the outlets 80 and 81. The outlet 80 is connected with a conduit which leads to a shower, while the outlet 81 is connected with a conduit which leads to a tub.

While I have shown the inner or front ends of the outlets 80 and 81 as located at the rear end or rear side of the casing 2, it will be understood that the inner ends of the said outlets may be otherwise located and that the position of the valve may be likewise altered so as to cooperate with the outlet openings. It is, however, necessary and essential that the valve 82 be mounted upon a rotatable part of the valve construction. It may be noted that the valve 82 is of such shape that both of the outlet openings 80 and 81 cannot be closed simultaneously, or at the same time. Only one of the said openings at a time may be closed.

Instead of the springs 90 for yieldingly holding the valve 82 in contact with the front ends of the walls of the outlet openings 80 and 81 I may employ a compressible yielding member 91 of rubber or the like as shown in Fig. 7. In every other respect the construction as illustrated in Fig. 7 of the drawings is identical with that illustrated in other figures of the drawings.

It will be noted that the rear portions of the valve elements 61 and 62 are of spiral structure. The rear end of the valve element 61 terminates in a portion 92 which is cylindrical except for a shallow depression at 93. When the valves 61 and 62 have been opened to their fullest extent the rearward portion 92 of the valve 61 enters the rear end of the inlet opening 72 to close the same, except for the shallow depression 92, previously referred to, with the result that the amount of cold water which is admitted into the valve casing is greatly reduced. At such time, however, the valve element 62 permits the maximum amount of hot water to enter the said valve casing. If the handle 20 shall have been turned in a direction to carry the pointer 22 toward that portion of the cover or dial plate marked shower, the valve 82 will at the same time be moved into position to uncover the outlet 80 to the shower and at the same time will be moved into position to close the outlet 81 leading to the tub. During the initial part of the movement of the handle 20 in either direction the valve 61 is first opened to permit the entry of cold water into the casing 1. Movement of the valve 62 is at the same time effected, but interposed between the washer 64 and the rear spiral portion of the valve element 62 is a cylindrical section 94 which is mounted within the inlet opening 73, so that the said opening is not opened until the valve 62 has moved forwardly a sufficient distance to remove the cylindrical section 94 from the said opening. In the meantime cold water has been permitted to enter the casing. It will be seen, therefore, that it is not until after there has been considerable flow of cold water into the casing that the hot water is permitted to enter the same. It will be understood, therefore, that initially cold water only is discharged from the outlet opening leading either to a shower or to a bath tub and that thereafter the entry of the hot water is permitted.

As the handle 20 approaches the limit of its movement in either direction from the normal position, as shown in Fig. 1, the amount of cold water admitted to the valve casing decreases, until finally, only a very small portion of cold water is permitted to enter. If desired, the rear end portion 92 of the valve element 61 may be made completely cylindrical in order to completely close the inlet opening 72 when the handle 20 has been rotated to its extreme position in either direction from its normal inoperative position.

By reason of the lost motion or play between the projection 37 and the projections 38, 39 and 40 the valve 82 which is mounted to rotate in synchronism with the valve control shaft 15 is caused to move to open one of the outlet openings and close the other of said openings before the opening of either of the hot or cold water inlet openings.

It will be seen that by my invention I have provided an extremely simple and efficient valve construction including means whereby a plurality of valves may be simultaneously actuated and controlled for controlling the ingress and egress of water into and from the casing of the structure.

Having thus described my invention, what I claim and desire to secure by Letters Patent is:

1. A valve structure of the character described comprising inlet and outlet openings, a rotatable valve control shaft, a valve supported on said shaft for opening and closing the inlet openings and a valve also supported on said shaft for opening and closing the outlet openings, means mounted on said shaft to cause rectilinear operative movements of the said first-named valve upon rotation of said shaft and to cause rotative movement of the second-named valve to close either of the outlet openings and to open the other as desired.

2. A valve structure of the character described comprising, in combination, a valve casing having inlet and outlet openings, a valve control shaft, a rotatably mounted tubular member through which said shaft extends, said member being provided with a curved transversely extending cam slot, a sleeve slidably mounted upon the said control shaft, said sleeve having a projection extending into the said cam slot whereby upon rotation of the said tubular member the said sleeve is caused to slide upon the said shaft, valves for controlling the said inlet openings, means for supporting said valves on said sleeve, a valve for opening and closing the said outlet openings, and means for causing rotation of said valve simultaneously and in unison with the rotation of the said tubular member.

3. A valve structure of the character described comprising, in combination, a valve casing having inlet and outlet openings and also having an opening in the front side thereof, a rotatable tubular member mounted within said last-mentioned opening, said member having a curved transversely extending cam slot therein, the convex edge of the said cam slot facing toward the interior of the valve structure, a rotatable valve control shaft extending through the said tubular member, means whereby upon rotation of the said shaft rotation of said tubular member is effected, valves for controlling the said inlet openings, connections between the said valves and the said cam slot whereby upon rotation of the said tubular member in one direction or the other rectilinear movements of the said valves in one direction or the other to close or open the said inlet openings are effected, and a valve for opening and closing the said outlet openings, the said valve rotating in unison with the said valve control shaft.

4. A valve structure of the character described comprising in combination a valve casing having inlet and outlet openings, valves for controlling the inlet openings, a valve for controlling the outlet openings, a movable member common to all of said valves for actuating the same, the said last mentioned valve being movable with said member, and lost motion means interposed between said member and the valves for controlling the inlet openings whereby the said last mentioned valve is adapted to be operated to open one of the said outlet openings and to close the other before the said valves for controlling the inlet openings are moved into position to open the said inlet openings.

5. A valve structure of the character described comprising, in combination, a valve casing having inlet and outlet openings and also having an opening in the front side thereof, a tubular member mounted in said last mentioned opening, said member being provided with a curved cam slot extending transversely thereof, the portions of said slot upon opposite sides of the middle thereof extending toward the front end of the said cam, a valve operating shaft extending through the said tubular member, said shaft being rotatable, valves for controlling the inlet openings, means whereby the said valves are slidably supported upon the said shaft, means interposed between the said shaft and the said tubular member for effecting rotation of the latter upon rotation of the said shaft, means having connection with the said valves and having engagement with the said cam slot whereby upon rotation of the said tubular member slidable movement of the said valves with relation to the said shaft is effected, and means mounted upon the said shaft for controlling the outlet openings.

6. A valve structure of the character described comprising, in combination, a valve casing having inlet and outlet openings and also having an opening extending through the front side thereof, a tubular member mounted in said last-named opening, said tubular member being provided with a curved cam slot the portions thereof upon opposite sides of its middle extending toward the front end of said tubular member, a rotatable valve control shaft, means interposed between said shaft and the said rotatable tubular member, whereby upon rotation of said shaft rotation of said tubular member may be effected, a sleeve slidably mounted on said shaft the front end of such sleeve extending into the said tubular member and being provided with a projection which extends into the said cam slot, whereby upon rotation of the said tubular member slidable movement of said sleeve is effected and the said sleeve being provided at its rear end with a lateral support, valves mounted thereon for controlling the inlet openings, and means mounted upon the said shaft and rotating therewith to control the outlet openings from the said valve casing.

In testimony that I claim the foregoing as my invention, I have hereunto signed my name this 26th day of April, A. D., 1926.

JOHN W. LAWLESS.